United States Patent [19]
Seidel et al.

[11] Patent Number: 5,855,737
[45] Date of Patent: Jan. 5, 1999

[54] PROCESS FOR REGENERATING A LIQUID CREATED IN THE KRAFT PROCESS FOR PULPING WOOD, WHILE SIMULTANEOUSLY OBTAINING HIGH ENERGY EFFICIENCY

[75] Inventors: Wolfgang Seidel, Oberbobritzsch; Manfred Schingnitz, Freiberg; Jürgen Görz, Freiberg; Peter Göhler, Freiberg, all of Germany

[73] Assignee: Noell-KRC Energie und Umwelttechnik Niederlassung Freiberg, Freiberg, Germany

[21] Appl. No.: 747,960

[22] Filed: Nov. 12, 1996

[51] Int. Cl.$^6$ .................................................. D21C 11/04
[52] U.S. Cl. ........................ 162/30.11; 162/47; 110/238; 60/39.05; 60/39.12
[58] Field of Search ............................... 162/30.1, 30.11, 162/47; 110/238, 239; 422/185; 60/39.05, 39.12, 39.511, 39.512, 39.53, 39.59

[56] References Cited

U.S. PATENT DOCUMENTS

| | | | |
|---|---|---|---|
| 4,217,132 | 8/1980 | Burge et al. | 75/26 |
| 4,586,443 | 5/1986 | Burge et al. | 110/347 |
| 4,808,264 | 2/1989 | Kignell | 162/30.1 |
| 5,302,247 | 4/1994 | Richardsen et al. | 162/42 |
| 5,507,141 | 4/1996 | Stigsson | 60/39.05 |

FOREIGN PATENT DOCUMENTS

| | | |
|---|---|---|
| 0 459 962 A1 | 5/1991 | European Pat. Off. . |
| 2 138 458 | 10/1984 | United Kingdom . |
| 2 165 770 | 4/1986 | United Kingdom . |
| WO 93/02249 | 2/1993 | WIPO . |
| 94/20677 | 9/1994 | WIPO . |
| WO 96/14468 | 5/1996 | WIPO . |

OTHER PUBLICATIONS

Pamphlet, "CHMREC™ Pressurized Black Liquor Gasification", May 1996.

Primary Examiner—Stanley S. Silverman
Assistant Examiner—Dean T. Nguyen
Attorney, Agent, or Firm—Cohen, Pontani, Lieberman & Pavane

[57] ABSTRACT

An apparatus and process for regenerating a liquid from a spent liquid containing sodium compounds created during kraft processing for pulping wood while simultaneously obtaining energy. Regeneration begins by gasifying said sodium compounds in a gasification reaction chamber at a temperature greater than the melting temperature of the sodium compounds and generating a gasification gas and salt melt. The gasification gas and salt melt are then directly cooled to a temperature greater than the dew point in the quenching chamber by spraying a cooling liquid which, in turn, causes gaseous condensate to form a bath in the quenching chamber which may also include water from kraft processing. The salt melt dissolves in the bath to produce an aqueous solution. This aqueous solution is then cooled and diluted with alkali liquid produced during the kraft process. Then the diluted aqueous solution is subjected to flashing and emerges as a regenerated liquid free of organic components to be used again in the wood pulping process. Simultaneously, the gasification gas from the quenching chamber is indirectly cooled thereby producing energy through at least one of steam and hot water and subsequently desulfurized.

22 Claims, 3 Drawing Sheets

PROCESS FOR REGENERATING A LIQUID CREATED IN THE KRAFT PROCESS FOR PULPING WOOD, WHILE SIMULTANEOUSLY OBTAINING HIGH ENERGY EFFICIENCY

BACKGROUND OF THE INVENTION

1. Field of the Invention

The invention relates to a process for regenerating a liquid from a spent liquid, in particular, black liquor from the kraft process for pulping wood, while simultaneously obtaining energy.

2. Description of the Related Art

In the generally known kraft process, fragmented wood is pulped with a liquid that consists essentially of soda lye, sodium carbonate, sodium sulfide, sodium sulfate and other salts in order to obtain cellulose. The liquid used is enriched with organic components, for example, carbon, oxygen and hydrogen. A liquid known as black liquor is created, the dry material of which consists of approximately 30% to 40% by weight of soda lye and salts and approximately 60% to 70% by weight of organic material.

According to the prior art, the black liquor is evaporated in a boiler apparatus until its dry material or matter is less than or equal to approximately 80% by weight and then burned in a substantially pressure-free environment, so that the organic components can be used for energy and the sulfur containing compounds removed in the most substantially reduced form possible. For this purpose, the lower part of the boiler apparatus, where the salt melt develops, is operated in substoichiometric fashion. The salt melt, which consists of $Na_2CO_3$, $Na_2S$ and $Na_2SO_4$, is dissolved with weak wash, a liquid containing NaOH that is created during the kraft process, and is discharged as green liquor.

In the subsequent caustification process, approximately 80% to 85% of the sodium carbonate is converted into calcium hydrogen carbonate and soda lye. After separation of the calcium hydrogen carbonate, a liquid known as white liquor is obtained. This white liquor is essentially an aqueous solution of soda lye, sodium sulfide, sodium carbonate and sodium sulfate which may be reused for wood pulping. The necessary ingredients of the white liquor are soda lye and sodium sulfide.

The method according to the prior art is subject to several disadvantages. One disadvantage associated with such conventional kraft processes is that no reduction occurs during the combustion of black liquor in the upper part of the boiler, which is operated in superstoichiometric fashion. As a result, the flue gas contains $SO_2$ and $Na_2SO_4$ pollutants which must be removed by expensive flue-gas purification measures, for example, flue-gas desulfurization and electric filters, before being emitted into the atmosphere. Furthermore, the salt melt also contains sodium sulfate and sodium thiosulfate, which are not removed in the subsequent processing steps and—since they are not needed during wood pulping—circulate as ballast or material in the kraft process.

Furthermore, during the combustion of black liquor at the usual temperatures of approximately 900° C. to 1000° C., only a negligible share of soda lye is created in the salt melt. However, soda lye is vital for the process of wood pulping. A majority of the required soda lye is obtained during the caustification process that follows combustion, and the rest must be added in the form of additional NaOH.

Another disadvantage of the kraft process in accordance with the prior art technique is that the chemically-bound heat of the black liquor is converted into steam at low boiler efficiency thereby making it extremely difficult, if not impossible, to produce a combustible gas.

World Intellectual Property Organization patent publication 93/02249 describes a process for the pyrolysis and partial combustion of liquids containing sodium compounds. In this process, pyrolysis and partial combustion occur in an uncooled, lined reaction chamber. This process is disadvantageous in that the lining material is damaged by the liquid melt created during the process as well as by the sulfurous crude gas, thereby reducing the serviceable life of the reactor lining. In addition, the subsequent removal of dry slag or cinder entails greater apparatus-related expense for separating the produced gas and salt particles and also raises the risk of caking and incrustation in the gas channel and salt remover.

European patent publication 0 459 962 A1 discloses a process that uses a quenching system for cooling the crude gas, so that the salts can be removed from the reactor as a dissolved solute. This proposed process has the disadvantage that, because of the longer contact time of the salts with the $H_2O$, $CO_2$ and $H_2S$ in the crude gas prior to dissolution in water, chemical reactions result in undesirable carbonate formation. Furthermore, it is possible to obtain soda lye by gasification only to a limited extent, if at all.

Thus, all known processes for the thermal recovery of green liquor from black liquor have the disadvantage that either not enough $Na_2CO_3$ is decomposed and not enough NaOH is formed during the thermal treatment, and/or that the formed soda lye reacts during the direct gas cooling with $CO_2$ and carbonate is again formed. As a result, the required NaOH must either be obtained by caustification of $Na_2CO_3$ or added to the kraft process as additional NaOH.

SUMMARY OF THE INVENTION

An object of the present invention is to provide a process for regenerating an alkali liquid, in particular black liquor, produced during wood pulping and needed in the kraft process in such a way as to obtain, largely independent of the black liquor quality, a target product, green liquor, with an improved quality, which permits the production capacity of the kraft process to be increased without requiring an increase in the caustification capacity within the kraft process.

A further object of the invention is to reduce the emissions of the kraft process in general and, in particular, those that occur during the regenerating of black liquor into green liquor, and thus to reduce losses of the sulfur compounds needed for wood pulping so that it is practically unnecessary to add sulfur to the kraft process in order to compensate for loss.

Another object of the invention is to design the process of regenerating black liquor into green liquor in such a way as to produce, along with the improved target product, green liquor, a combustible gas with a high thermal value, which has the combined qualities of being used for material as well as for energy.

The regeneration technique in accordance with the present invention begins by gasifying said sodium compounds in a gasification reaction chamber at a temperature greater than the melting temperature of the sodium compounds and generating a gasification gas and salt melt. The gasification gas and salt melt are then directly cooled to a temperature greater than the dew point in the quenching chamber by spraying a cooling liquid which, in turn, causes gaseous condensate to form a bath in the quenching chamber which may also include water from the kraft processing. The salt melt dissolves in the bath to produce an aqueous solution. This aqueous solution is then cooled and diluted with an alkali liquid produced during the kraft process. Then the diluted aqueous solution is subjected to flashing and emerges as a regenerated liquid free of organic components which is used again in the wood pulping process. Simultaneously, the gasification gas from the quenching chamber is indirectly cooled thereby producing energy through at least one of steam and hot water and then desulfurized.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals delineate similar elements throughout.

DETAILED DESCRIPTION OF THE PRESENTLY PREFERRED EMBODIMENTS

Although the process in accordance with the invention is described, for illustrative purposes, for the gasification of black liquor, the invention is not and should not be limited to this specific area of technology.

Figure 1:
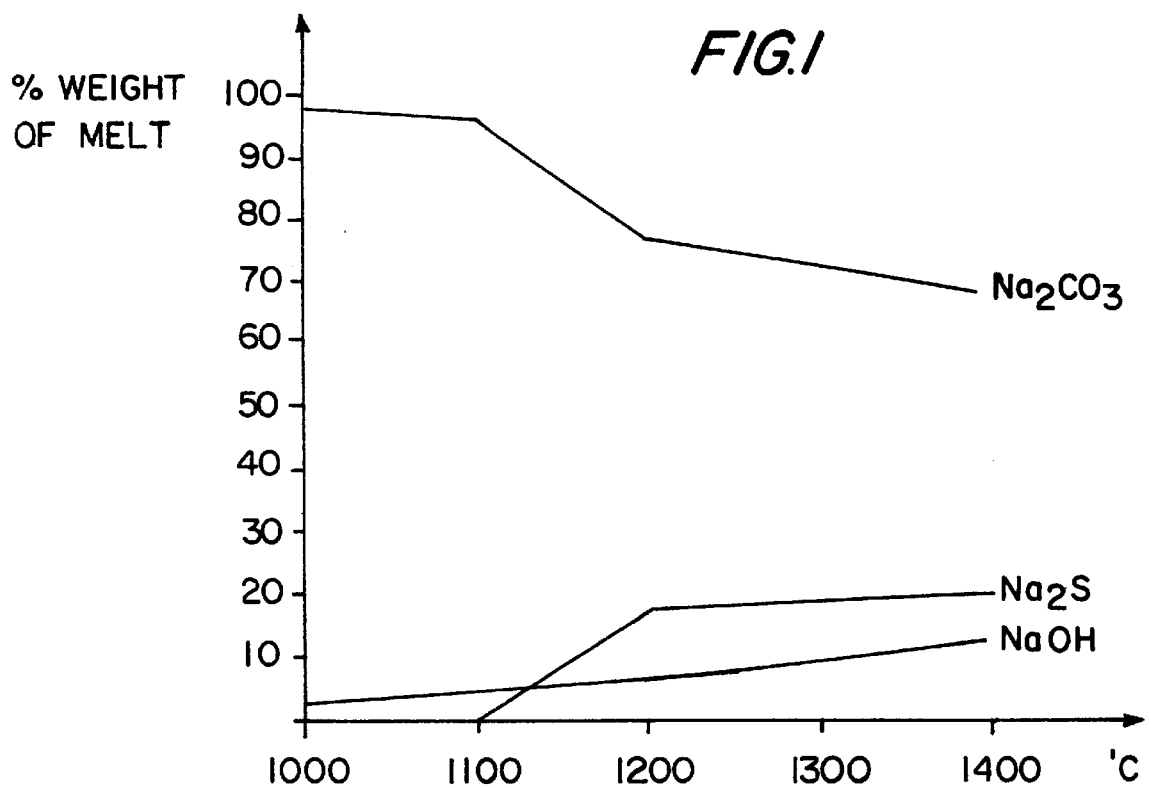
FIG. 1 represents the percentages by weight of $Na_2CO_3$, $Na_2S$ and $NaOH$ as a function of the temperature of the salt melt.
Figure 2:
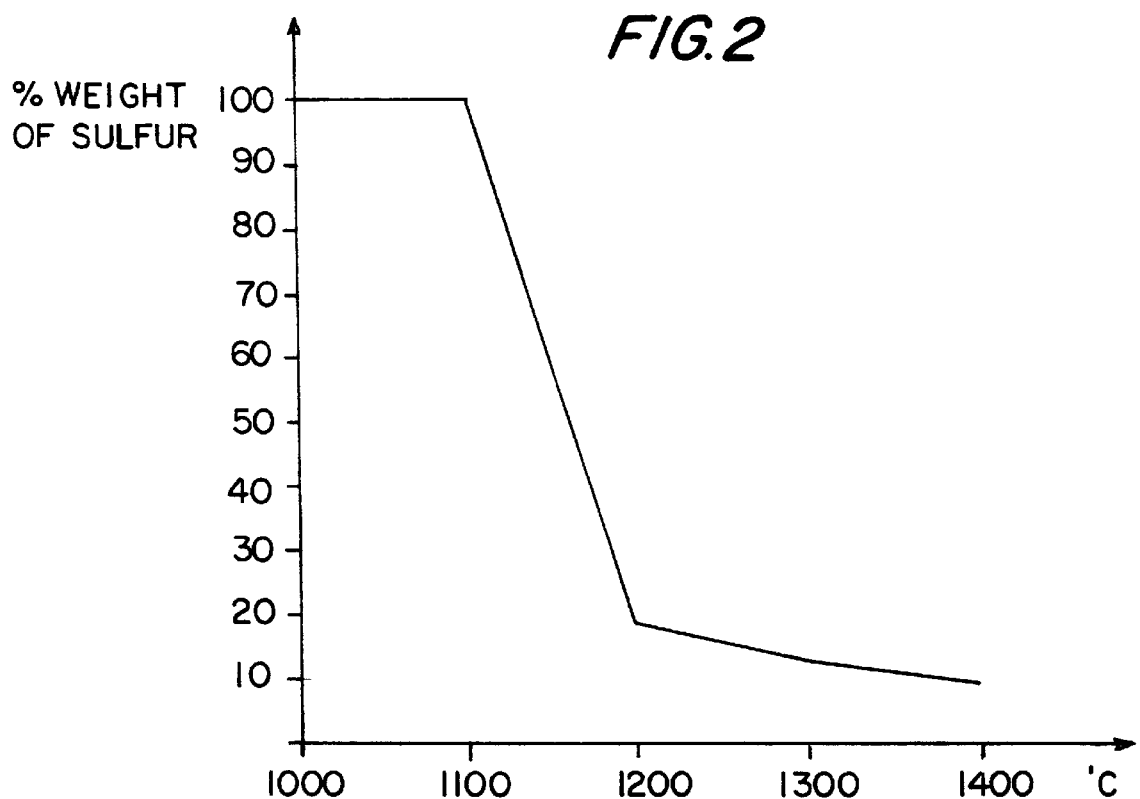
FIG. 2 represents the percentages by weight of sulfur S in the crude gas as a function of temperature.

It has been recognized that by utilizing the conditions shown in FIG. 1 i.e., by taking advantage of the fact that as gasification temperature increases the formation of $Na_2CO_2$ in the melt declines in favor of the formation of $Na_2S$ and $NaOH$, and the creation of $H_2S$ in the crude gas also declines, as shown in FIG. 2. Thus, it is possible to increase the yields of $Na_2S$ and $NaOH$, needed for wood pulping, by increasing the gasification temperature.

In accordance with the gasification conditions of the present invention, there is no formation of $SO_2$. The sulfur in the black liquor is advantageously created in the salt melt as a sulfide. This also applies to the sodium sulfate and sodium thiosulfate in the black liquor, which are also reduced to sulfide. These sulfur compounds, which are not needed for wood pulping, are prevented from circulating in the kraft process. During gasification, carbon conversion of greater than or equal to approximately 99.5% is achieved. This reduces the purification steps needed during the kraft process to separate out organic material in the green liquor and white liquor.

Figure 3:
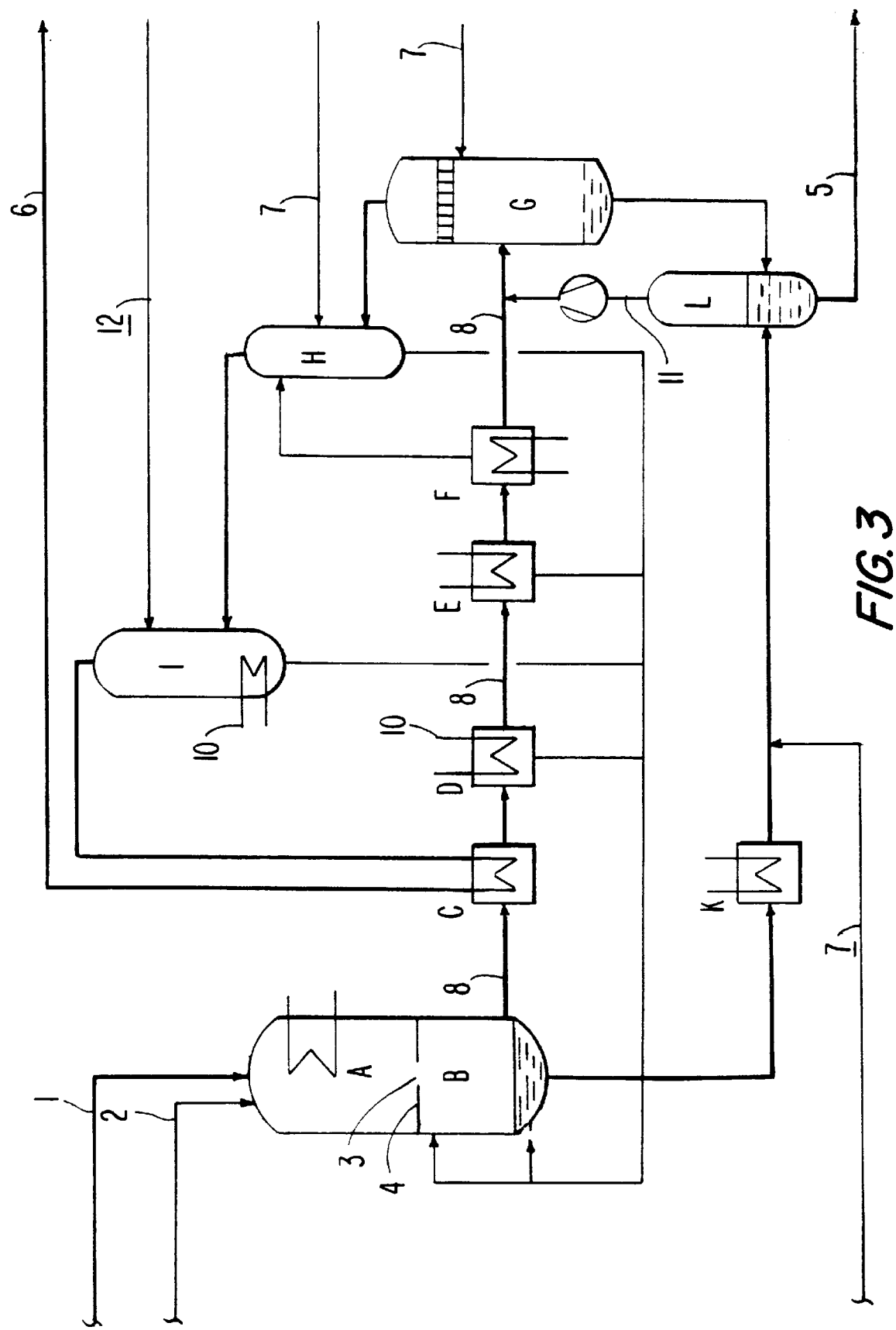
FIG. 3 schematically shows a system configuration for regenerating black liquor into green liquor produced during the kraft process for pulping wood in accordance with a first embodiment of the present invention.

FIG. 3 shows a first embodiment of a system configuration for regenerating black liquor into green liquor produced during the kraft process for pulping wood in accordance with the present invention. Black liquor 1 produced in a kraft process during wood pulping, after being evaporated, using known methods, to dry material, for example, approximately 60% to 80% by weight, is fed to a fly-flow gasification reaction chamber A with a cooled reaction chamber lining and gasified therein at temperatures greater than the melting point of the sodium compounds in the black liquor, specifically at temperatures between approximately 1000° C. and 1600° C.

Gasification of the black liquor is performed in reaction chamber A with an oxygen-containing oxidating agent or commercial oxygen 2 which is also fed to the reaction chamber A. In comparison to gasification with air, gasification with an oxygen-containing oxidation agent or commercial oxygen has economic advantages, especially in the case of pressure gasification, including (1) the production of a gasification gas with a substantially higher thermal value (2) the elimination of the need for an air compressor and (3) the reduction of the necessary unit volume by the reduced nitrogen load in the gasification gas.

The regeneration technique in accordance with the present invention is equally suitable for use with substantially pressure-free gasification (approximately atmospheric pressure) and gasification under increased pressure (greater than atmospheric pressure). Gasification at substantially atmospheric pressure may be more economical than increased pressure gasification when the gasification output is relatively small, especially when little importance is attached to or placed upon the thermal value of the produced gasification gas or when the gasification gas is burned at approximately atmospheric pressure, for example, in a boiler apparatus. On the other hand, particularly in the case of a large gasification output, such as those typical during the kraft process, or when the produced gasification gas is to be used under pressure, increased pressure gasification is more economical than substantially pressure-free gasification, especially because of the lower unit volumes. This is the case, for example, when gas turbines or gas engines are connected downstream or when the gasification gas is to be utilized materially, such as for methanol, ammonia or hydrogen production.

At an equilibrium temperature crude gas 3 and salt melt 4 emerge together downward from the reaction chamber A and enter into a quenching chamber B, where they are subjected to sudden cooling by a liquid. Preferably, cooling is carried out to temperatures between approximately 300° C. and 700° C., so that even under pressurized conditions the gasification gas is not saturated with steam and the dew point is not reached. Direct sudden cooling of the crude gas to approximately 300° C. to 700° C. not only substantially suppresses chemical reactions, but also, results in the advantage of allowing heat energy to be obtained at a high level during subsequent indirect cooling. The higher-level process heat created during gasification at a high gasification temperature may be utilized completely in the kraft process. Consequently, the use of outside energy is reduced because a combustible gas with a high thermal value has a high energy efficiency.

Gaseous condensate is sprayed or fed in the quenching chamber B to suddenly cool the crude gas 3 and salt melt 4. Alternatively, or in addition to the gaseous condensate, water from the kraft process may also be fed into the quenching chamber. The supply of gaseous condensate and/or alkali process water from the kraft process provides a maintained water bath in the basin of the quenching chamber B. Salt melt produced in the reaction chamber A drops into the basin of the quenching chamber B and dissolves in the bath to form an aqueous solution whereby it is continuously removed with the water. Because of the short retention time of the salt particles between their emergence from the gasifier and their entry into the water bath, as well as the non-saturation of the crude gas with steam, chemical reactions in the quenching chamber are substantially suppressed. As a result, liquid known as green liquor withdrawn from the basin of the quenching chamber B largely contains the components of the salt melt, mainly $Na_2CO_3$, $Na_2S$ and NaOH. Because the green liquor contains a greater amount of NaOH, a smaller amount of $Na_2CO_3$ and no sulfate, the subsequent caustification process is simplified, thereby making it possible to increase the production capacity of the kraft process without increasing the caustification capacity.

The design of reaction chamber A with a cooled reaction-chamber contour lining makes it possible, technically and economically, to operate at gasification temperatures greater than approximately 1000° C., and to substantially reduces corrosion of the reaction chamber wall by the sodium and sulfur compounds in the gasification gas and the salt melt. Furthermore, the contamination of the salt melt with dissolved material from the reaction chamber wall is substantially reduced and the gasification process is far less susceptible to fluctuations in the chemical composition of the black liquor. The process heat removed by means of the reaction chamber cooling is used to produce low pressure steam, which may be used in the kraft process, for example, to evaporate the black liquor to approximately 60% to 80% by weight of dry material.

Once again referring to the regeneration apparatus arrangement shown in FIG. 3, the green liquor from the quenching chamber basin is then cooled in a cooler K. After cooling, the green liquor is diluted with weak wash 7, an alkali liquid created during the kraft process, in order to reduce the salt concentration. The diluted liquid then passes through a flash container L and is discharged to caustification within the kraft process in the form of green liquor 5. Flash gas produced during flashing in the flash container L is recompressed and remixed with the gasification gas 8.

Simultaneously, gasification gas 8 emerging from the quenching chamber B may then be passed through a crude gas/purified gas heat exchanger C, in which desulfurized purified gas 6 is heated to a maximum entry temperature of a gas turbine causing heat to be transferred. Gasification gas 8 then enters a steam-generating unit D producing steam 10 which may be used to heat a saturator I and/or discharged to evaporators within the kraft process.

After passing through the steam generating unit D, gasification gas 8 passes through a heat exchanger E and then the gasification gas 8 is cooled in a cooler F, such as a multi-stage cooler. Thus, in accordance with the regeneration process of the present invention the gasification gas is first directly cooled to between approximately 300° C. to 700° C. in the quenching chamber B and then indirectly cooled to approximately 90° C. The tangible heat of the gas and the condensation heat of the steam produces high, medium or low pressure steam and hot water, which may be utilized in the kraft process, for example, to heat and evaporate flows of liquid or may be fed to a steam turbine unit.

After direct and indirect cooling of the crude gas, gaseous desulfurization is carried out using the alkali process waters created in the kraft wood pulping process. This step is made possible by the fact that less $H_2S$ develops in the gasification gas at the higher gasification temperatures shown in FIG. 2, which permits minimal conversion of NaOH and $Na_2CO_3$ contained in the alkali process. An additional advantage provided is that, along with the desired conversion of $H_2S$ into sodium sulfide, only a small amount of $CO_2$ is converted to sodium carbonate.

The goal of higher $H_2S$ and lower $CO_2$ conversion is thus supported by the low $H_2S$ content in the crude gas that can be attained during gasification at an increased gasification temperature. Cooling of the crude gas prior to desulfurization intensifies the selectivity of the washing agent of the process itself relative to $H_2S$. For the purpose of $H_2S$ absorption, spray quenching is carried out with a small contact time between the gasification gas and the alkali process liquid. This further reinforces the selective $H_2S$ wash.

Desulfurization with the alkali liquid created in the process is advantageous in that it eliminates the need for a separate desulfurization step, such as an amine wash, thereby reducing the cost of the overall process. A further advantage is that a gaseous desulfurization of substantially 100% is possible, so that sulfur loss within the kraft process substantially approaches zero. As a result, it is also possible to maintain a constant sulfur content in the alkali liquid circulating in the kraft process without the need for significant make-up additions.

In particular, as shown in FIG. 3, gaseous desulfurization is performed by an absorber G for absorbing pollutants. Sulfur contained in the gasification gas is absorbed, such as by spray quenching, with an alkali liquid, for example, weak wash 7. It is preferred that absorber G be designed in such a way that the process of spray quenching allows a small contact time between the gasification gas and a sprayed-in absorption liquid 11, which here is the green liquor from the quenching basin sump. Because absorption occurs under pressure and at a lowered temperature, sulfur conversion of less than approximately 99% is possible. The green liquor is enriched by the conversion of $H_2S$ and $CO_2$, primarily with $Na_2S$ and NaHS as well as with $Na_2CO_3$ and $NaHCO_3$, and is mixed with the green liquor in the flash container L.

The desulfurized purified gas may be rewashed after desulfurization, for example, using a rewash means H and a saturator I. In the lower stage, the desulfurized purified gas is rewashed using an alkali liquid; in an upper stage of the rewashing process, the gas is subjected to a fine wash with gaseous condensate and boiler feed water 12 in order to separate the alkalis from the purified gas. The purified gas emerging from the saturator I is heated by the crude gas/purified gas heater exchanger C and discharged, for example, to a gas turbine engine. The gaseous condensate created in the steam-generating unit 10, in the heat exchanger E for preheating the boiler feed water, and in the cooler F may be used to cool the crude gas and/or dissolve the salts in the quenching basin sump B.

In order to make the process more economical, it is possible to gasify solid, liquid or gaseous combustible materials, which, for example, are present in the form of waste materials to be removed, in addition to the main combustible material.

Figure 4:
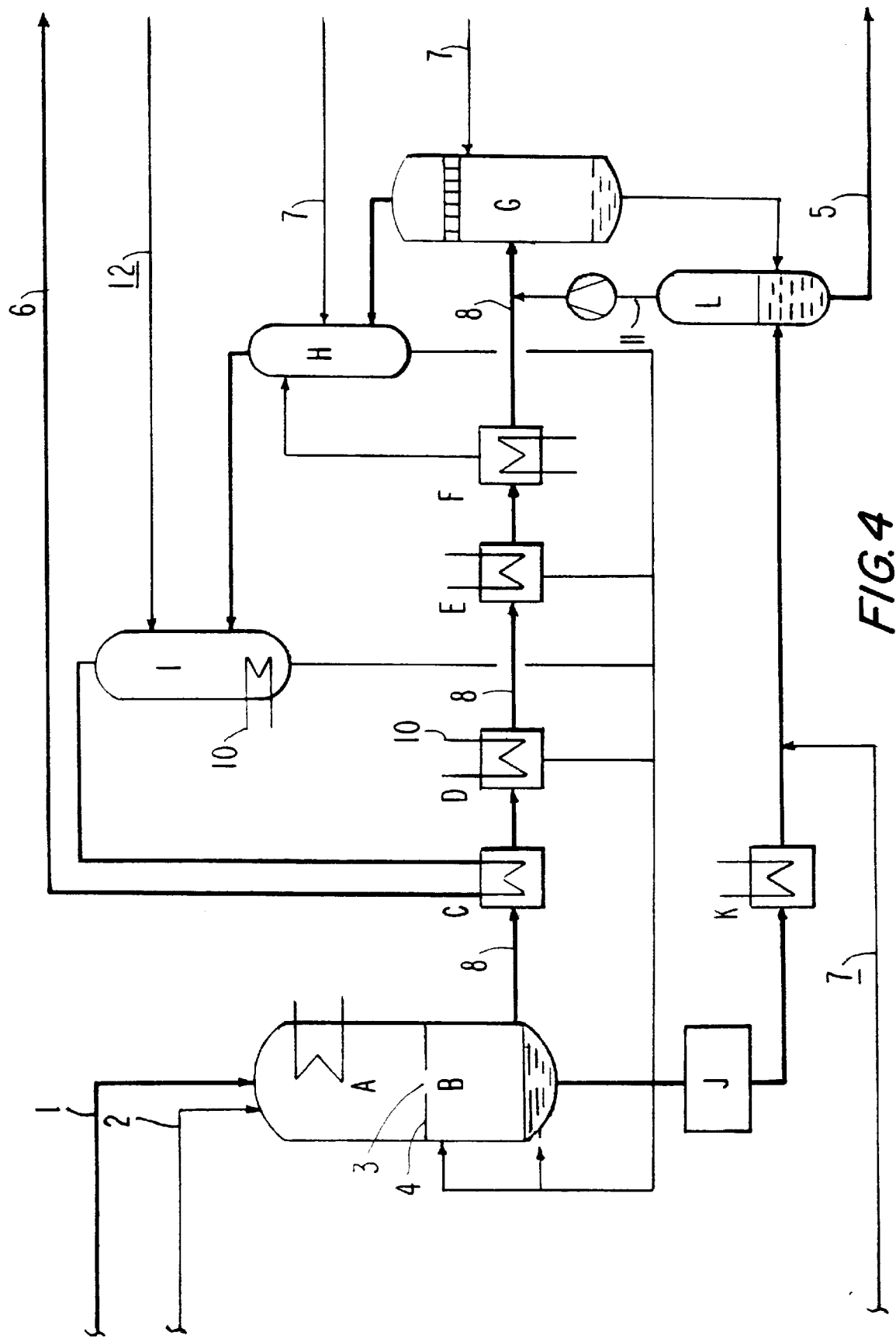
FIG. 4 schematically shows a system configuration for regenerating black liquor into green liquor produced during the kraft process for pulping wood in accordance with a second embodiment of the present invention.

In a second embodiment illustrated in FIG. 4, a granulate sluice J may be connected after the quenching chamber, from which molten ash components of the extra combustible materials may be withdrawn in the form of granulate. After the granulate and the liquid are separated, the liquid is fed to the flash container, as previously described, and the gas from the flash container is fed in recompressed fashion into the crude gas flow in front of the $H_2S$ absorber. The separated granulate is glass-like and may be disposed of after being washed to remove salts adhering to the surface or, depending upon its composition, used again.

EXPERIMENTAL RESULTS

The following test results were obtained using a system configuration for the regeneration of liquid in a kraft process as shown in FIG. 3. Black liquor 1 and commercial oxygen 2 were fed to reaction chamber A having a cooled reaction chamber lining and a pressure of 26 bar. The heat transfer produced by the reaction chamber cooling was 5 MW. At an equilibrium temperature of approximately 1400° C., crude gas 3 and salt melt 4 entered into the quenching chamber. Approximately 91% of the sulfur in the black liquor was converted directly into sodium sulfide and only approximately 9% was contained in the crude gas. Analyses of the produced crude gas and the melt are shown in Table 1.

TABLE 1

Crude Gas and Salt Melt Results

| | | | |
|---|---|---|---|
| Black liquor | | 85 000 kg/h | |
| Water content | | 30% | |
| $H_U$, dry | | 13 701 kJ/kg | |
| Oxygen | | 12 302 Nm³/h (95% by volume) | |
| Crude gas, dry | $H_2$ | % by volume | 39.4 |
| | CO | % by volume | 41.1 |
| | $CO_2$ | % by volume | 18.1 |
| | $N_2$ | % by volume | 1.1 |
| | $H_2S$ | % by volume | 0.3 |
| Melt | $Na_2CO_3$ | % by weight | 61.5 |
| | NaOH | % by weight | 13.8 |
| | $Na_2S$ | % by weight | 17.8 |
| | $K_2CO_3$ | % by weight | 3.7 |
| | KOH | % by weight | 2.6 |
| | $K_2S$ | % by weight | 1.5 |
| | NaCL + KCL | % by weight | 0.1 |
| Green Liquor | $Na_2CO_3$ | g/l | 139 |
| | NaOH | g/l | 47 |
| | $Na_2S$ | g/l | 43 |
| | K compounds | g/l | 15 |
| Purified gas, dry $H_2$ | % by volume | 39.8 | |
| | CO | % by volume | 41.4 |
| | $CO_2$ | % by volume | 17.7 |
| | $N_2$ | % by volume | 1.1 |

A higher gasification temperature than previously used with comparable processes, resulted in sodium percentages of 59.9% as carbonate, 23.5% as sulfide and 16.6% as $Na_2CO_3$. These results verify that caustification downstream in the kraft process can be eased or the capacity of the kraft process can be increased without expanding the caustification capacity by increasing the gasification temperature.

The crude gas and salt melt produced were then suddenly cooled in the quenching chamber by spraying gaseous condensate. Salt melt as it dropped downward from the reaction chamber dissolved in the bath of gaseous condensate and alkali process water at the basin of the quenching chamber and was continuously removed with the water.

Because of the short retention time of the salt particles between emergence from the gasifier and entry into the water bath and non-saturation of the crude gas with the steam, chemical reactions in the quenching chamber were significantly suppressed. The green liquid withdrawn from the quenching chamber basin, primarily containing the components of the salt melt, was then cooled in cooler K, in which warm water of approximately 75° C. was produced, thereby producing a heat transfer of approximately 2.6 KW. Thereafter, the warm water was used in the kraft process.

After cooling, the green liquid was diluted with weak wash 7, an alkali liquid created during the kraft process, in order to reduce the salt concentration. The liquid was then passed through flash container L and fed to caustification within the kraft process as green liquor 5. Flash gas from the flash container L was recompressed and remixed with the gasification gas.

The gasification gas 8 had a temperature of approximately 600° C. upon leaving the quenching chamber B. From the quenching chamber the gasification gas entered the crude gas/purified gas heat exchanger C and there the desulfurized purified gas 6 was heated to a maximum entry temperature of 260° C. of the gas turbine and 2.9 MW of heat was generated. Then the gasification gas entered a steam-generating unit D, in which 44.4 MW of process steam of 9 bar were produced. The process steam was used to heat the saturator I and for evaporation processing within the kraft process.

After passing through the steam generator D, the gasification gas passed through a heat exchanger E with an output of 17 MW in which boiler feed water was preheated, and the gasification gas was then cooled to approximately 90° C. in the cooler F producing 2.3 MW of energy. Following the multistage cooling of the crude gas, the gasification gas was desulfurized in absorber G. Absorber G was designed so that the process of spray quenching permitted only a small contact time between the gasification gas and the sprayed-in absorption liquid 11, in this case, green liquor, from the quenching chamber basin so that primarily $H_2S$, rather than $CO_2$, was absorbed from the gasification gas. Because absorption occurred under pressure and at a lower temperature, a sulfur conversion of less than approximately 99% was achieved. The green liquor was enriched by the conversion of $H_2S$ and $CO_2$, primarily with $Na_2S$ and NaHS as well as with $Na_2CO_3$ and $NaHCO_3$, and was then mixed with the green liquor flow in the flash container L.

The desulfurized purified gas was subjected to rewash also designed as a process of spray quenching. In the lower stage, an alkali liquid, in this case green liquor, was used during rewashing; in the upper stage, gaseous condensate and boiler feed water were used in a fine wash in order to separate the alkalis from the purified gas. Downstream, in saturator I, the purified gas was saturated with boiler feed water 12 to its optimal gas-turbine state, in this case, a steam content of approximately 30%.

After being heated to approximately 260° C. in the crude gas/purified gas heat exchanger C, purified gas was discharged into the gas turbine with the chemically-bound heat of the purified gas resulting in an energy of approximately 142 MW. The gaseous condensate created in the steam generator D, in the heat exchanger E for preheating the boiler feed water and in the crude gas cooler F was used for the purpose of crude gas quenching and in order to dissolve the salts in the quenching basin sump B.

In accordance with this experimental set-up and settings, it was found possible to detach 66.9 t/h 9-bar saturated steam, 33.3 t/h 170° C. boiler feed water and 75.5 t/h 75° C. warm water from the process and to discharge the energy to the kraft process.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended thereto.

We claim:

1. A process for regenerating a liquid from a spent liquid created during kraft processing for pulping wood, while simultaneously obtaining energy, said spent liquid containing sodium compounds extracted during wood pulping, said process comprising the steps of:

(a) gasifying said spent liquid containing sodium compounds in a reaction chamber at a temperature greater than a melting temperature of said sodium compounds thereby generating a gasification gas and salt melt;

(b) directly cooling said gasification gas and said salt melt to a temperature greater than a dew point in a quenching chamber by spraying a cooling liquid thereby causing gaseous condensate to form a bath within said quenching chamber;

(c) indirectly cooling said directly cooled gasification gas from said quenching chamber while simultaneously producing energy through at least one of steam and hot water;

(d) dissolving said salt melt in the bath of said quenching chamber to create an aqueous solution, the bath comprising at least one of said gaseous condensate and water from said kraft process; and (e) removing organic components from said aqueous solution to produce said regenerated liquid.

2. The process as in claim 1, wherein said step (b) comprises cooling said gasification gas to temperatures between approximately 300° C. and 700° C., and said salt melt drops into and dissolves in the bath in a lower portion of said quenching chamber.

3. The process as in claim 1, wherein said reaction chamber has a cooled reaction chamber lining.

4. The process as in claim 3, wherein said step (a) gasification of said sodium compounds is at a temperature between approximately 1000° C. and 1600° C.

5. The process as in claim 1, further comprising the step of desulfurizing said gasification gas, after having been directly and indirectly cooled, using alkali liquids created during said kraft process.

6. The process as in claim 5, wherein the alkali liquid is a weak wash.

7. The process as in claim 1, wherein said step (a) gasification is performed by using an oxygen-containing oxidation agent.

8. The process as in claim 1, wherein said spent liquid comprises one of solid, liquid and gaseous additional combustible materials.

9. The process as in claim 8 between steps (d) and (e), further comprising the step of separating granulate of molten ash components of the additional combustible materials from the aqueous solution.

10. The process as in claim 1, wherein in step (a) gasification is performed using oxygen.

11. The process as in claim 1, wherein said step (a) said reaction chamber has a cooled reaction chamber lining and gasification of said sodium compounds is at a temperature greater than approximately 1000° C. and less than approximately 1600° C.

12. A system for regenerating a liquid from a spent liquid created during kraft processing for pulping wood, while simultaneously obtaining energy, said spent liquid containing sodium compounds extracted during wood pulping comprising:

means for gasifying said spent liquid containing sodium compounds at a temperature greater than a melting temperature of said sodium compounds and generating a gasification gas and salt melt;

means for directly cooling said gasification gas and said salt melt to a temperature greater than a dew point, said direct cooling means connected to said gasification means and including means for spraying a cooling liquid thereby causing gaseous condensate to form within said direct cooling means, wherein at least one of said gaseous condensate and water from said kraft process form a bath in said direct cooling means in which said salt melt dissolves to produce an aqueous solution;

means for indirectly cooling said gasification gas from said direct cooling means while simultaneously producing energy through at least one of steam and hot water, wherein said indirect cooling means is connected to said direct cooling means; and means for removing organic components from said aqueous solution to produce said regenerated liquid, said removing means connected to said direct cooling means.

13. The apparatus in claim 12, wherein said direct cooling means cools the gasification gas to a temperature between approximately 300° C. and 700° C. and said salt melt drops into and dissolves in the bath in a lower portion of said direct cooling means.

14. The apparatus in claim 12, wherein said gasifying means has a cooled reaction chamber lining.

15. The apparatus in claim 14, wherein gasification of said sodium compounds is at a temperature between approximately 1000° C. and 1600° C.

16. The apparatus in claim 12, further comprising means for desulfurizing said gasification gas using alkali liquids generated during said kraft process, said desulfurizing means connected to said indirect cooling means.

17. The apparatus as in claim 16, wherein the alkali liquid is a weak wash.

18. The apparatus in claim 12, wherein gasification is performed using an oxygen-containing oxidation agent.

19. The apparatus in claim 12, wherein said spent liquid comprises one of solid, liquid and gaseous additional combustible materials.

20. The apparatus in claim 19, further comprising means for separating granulate of molten ash components of the additional combustible materials from the aqueous solution.

21. The apparatus as in claim 12, wherein gasification is performed using oxygen.

22. The apparatus in claim 12, wherein said gasifying means has a cooled reaction chamber lining and gasification of said sodium compounds is at a temperature greater than approximately 1000° C. and less than approximately 1600° C.

* * * * *